May 2, 1944.   C. J. COLLOM   2,347,935
TIMING CONTROL SYSTEM
Filed Feb. 6, 1941
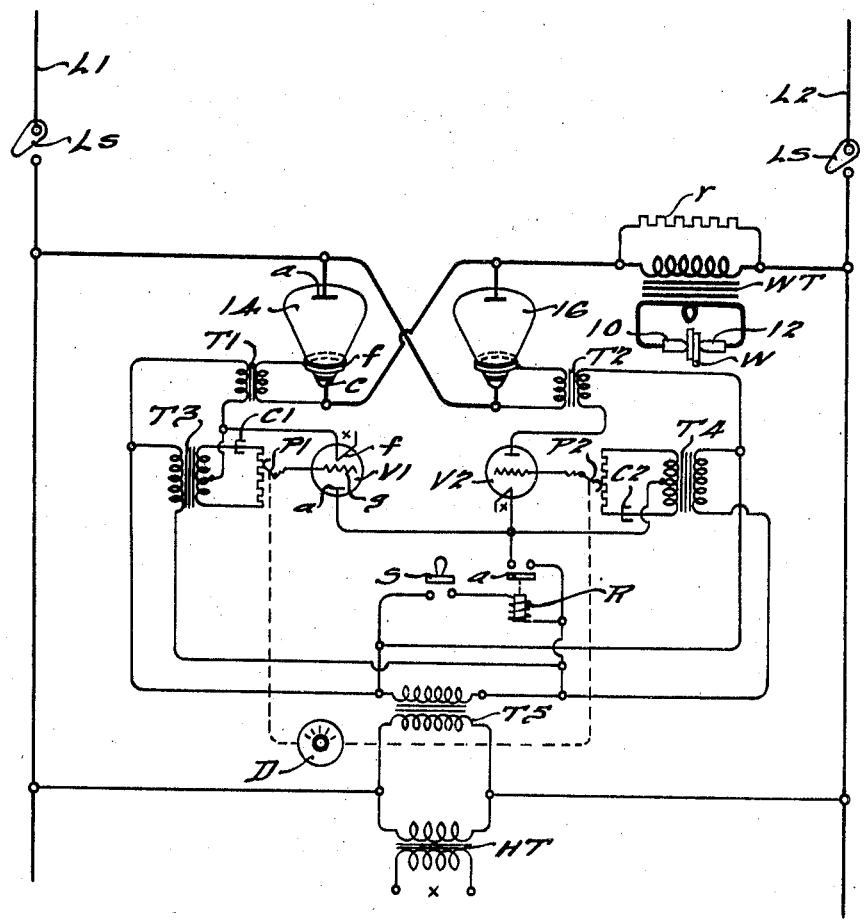
INVENTOR
Cletus J. Collom.
BY
Harness, Dickey & Pierce
ATTORNEYS.

Patented May 2, 1944

2,347,935

UNITED STATES PATENT OFFICE 2,347,935

TIMING CONTROL SYSTEM

Cletus J. Collom, Detroit, Mich.

Application February 6, 1941, Serial No. 377,679

1 Claim. (Cl. 250—27)

The present invention relates to electrical control systems, and in particular provides an improved system for controlling the flow of welding current from an alternating current source to an electric welding circuit.

The principal objects of the present invention are to provide such a system of the above-indicated character, which is simple in arrangement, positive and reliable in operation and which is readily adjustable to control the quantity of current delivered to the welding circuit; to provide such a system employing gaseous discharge valves which may be rendered conducting by the application of a potential between the cathode and a make-alive element associated therewith; to provide such a system embodying an improved circuit arrangement for applying the aforesaid potential to the gaseous discharge valve; to provide such a system embodying an improved circuit arrangement for applying said firing potentials to a plurality of related gaseous discharge devices; and to provide an improved circuit arrangement for variably controlling the fraction of each half-cycle of the alternating current wave throughout which current is conducted to the work circuit.

With the above, as well as other objects in view, which appear in the following description and in the appended claim, a preferred but illustrative embodiment of the invention is shown in the accompanying drawing, in which:

Figure 1 is a diagrammatic view of a control system embodying the invention.

It will be appreciated from a complete understanding of the present invention that the improvements thereof may, in a generic sense, be embodied in control systems designed for various specific purposes. A preferred application of the invention, however, is the control of electric welding circuits, and, in an illustrative but not in a limiting sense, the invention is so disclosed herein.

Referring to the drawing, the secondary winding of an illustrative welding transformer WT is electrically connected to a pair of welding electrodes 10 and 12, between which illustrative workpieces W may be clamped so as to effect, by way of example, a spot welding operation. The primary winding of the transformer WT is connected, in parallel with a usual resistor $r$, across the lines L1 and L2 of a suitable alternating current source of, for example, 60 cycle frequency. The flow of current to the primary winding of the welding transformer is controlled by a pair of reversely connected gaseous discharge valves 14 and 16, each whereof may be of usual construction, but are illustrated as being of the general type described in Patent No. 682,690, issued September 17, 1901, to Hewitt. As will be understood, each of the devices 14 and 16 is provided with an anode $a$, a cathode $c$ and a make-alive or firing element $f$. Each firing element is in the form of a conducting ring, which surrounds the shell of the corresponding device in the region of the cathode $c$. It will be understood that the valves 14 and 16 are normally non-conducting, but that if a firing potential is applied between the firing ring $f$ and the cathode $c$ in such relation that the firing ring $f$ is positive with respect to the cathode $c$, and at a time when the anode $a$ is positive with respect to the cathode, the corresponding device is immediately rendered conducting, and remains so for the balance of the corresponding half-cycle of current wave. Preferably, and for the purpose of rendering the devices 14 and 16 more accurately responsive to the application of the firing potential, these devices, after having been initially evacuated, are charged with a relatively small amount of a gas, such as argon or neon.

It has been found that the firing characteristics of these valves are considerably more accurate and uniform if the firing potential is relatively high, of the order, for example, of 3,000 to 4,000 volts for a valve designed for operation on a 440 volt circuit. Accordingly, in the present instance, the firing potential for the valves 14 and 16 is applied through transformers T1 and T2, respectively. The secondary windings of the transformers T1 and T2 are included in local circuits which include only the associated firing rings $f$ and cathodes $c$, which circuits present a very high resistance to current flow. In order to avoid any possible injury to users of the system, in the event they should inadvertently complete a short circuit across the secondary terminals of the transformers T1 and T2, it is preferred to employ constructions having a relatively high leakage reactance. Constructions of this type are well known, and it will be understood that such transformers have the characteristic of developing a low secondary voltage in the event of a short circuit across the secondary terminals, but of developing a relatively high secondary voltage so long as the resistance of the secondary circuit is high.

The supply of current to the transformers T1 and T2 is controlled by a pair of firing valves V1 and V2, each whereof may be and preferably is of the usual three-element evacuated type, provided with an anode $a$, a cathode $f$, and a control grid $g$. As will be understood, the valves V1 and V2 are non-conducting so long as the grid potential is below a critical value relative to the cathode, but conduct current, during half cycles in which the anode is positive with respect to the cathode, provided the grid potential is raised to a valve above the just-mentioned critical value.

The grid potentials are controlled in the present system by means of a pair of transformers T3 and T4. The transformers T3 and T4 may be and preferably are of the peaking type having a relatively sharp wave form. With this arrangement, the transformers T3 and T4 develop their critical firing potentials only during a relatively small fraction of each corresponding half cycle, and by adjusting the point at which such critical potential is developed, the firing points of the devices 14 and 16 may be accurately determined so as to cause these devices to become conducting during all or any desired fraction of a particular half cycle. The control of the firing point of the transformers T3 and T4 is determined by associated phase shifting means comprising potentiometers P1 and P2, and condensers C1 and C2, which are simultaneously adjustable by a common manually operable control dial D.

It is thought that the remaining details of the system may best be understood from a description of the operation thereof. Assuming it is desired to effect a welding operation, the system may be conditioned for operation by closing the illustrative line switches LS, which action applies potentials across the principal electrodes of the devices 14 and 16. Under the conditions stated, however, these devices are non-conducting so that no current flows through the welding transformers. Closure of the line switches L1 and L2 also energizes a control transformer T5 and a heater transformer HT. The terminals of the transformer HT may be connected, as will be understood, to apply heating current to the cathodes of the firing valves V1 and V2, and this relation is indicated by the reference characters $x$. The secondary winding of the control transformer T5 is permanently connected to the primary windings of transformers T3 and T4, so that the closure of the line switches L1 and L2 also energizes the last-mentioned transformers.

The secondary winding of the transformer T3 is provided with a center tap which is permanently connected to the cathode of the corresponding firing valve V1. The terminals of the just-mentioned secondary winding are connected, in series with a condenser C1, to the terminals of the previously mentioned potentiometer P1. It will be understood that the polarities are such that during each half cycle in which the anode of valve V1 is positive with respect to the cathode thereof, the peak potential is developed in the secondary winding of the transformer T3, which potential brings the grid $g$ of the corresponding firing valve V1 to a critical value. The point in each such half cycle at which the critical potential is applied to the grid $g$ is variably determined by the adjustment of the potentiometer P1. Corresponding comments apply to the transformer T4 and the corresponding elements associated with valve V2, and it will be understood that the dial D is set so that for maximum welding heat, the critical potentials are applied to the grids of the valves V1 and V2 at points which fire the devices 14 and 16 at the zero points of the hypothetical waves of current flow through the devices 14 and 16. For lower values of welding heat, the dial D is turned so as to delay the firing points of the valves V1 and V2, as will be understood.

The continuous application of the firing potentials to the grids of the valves V1 and V2, as aforesaid, is normally without effect, since the plate circuits of the valves V1 and V2 are normally interrupted at the contact members $a$ of the control relay R.

In order to effect a welding operation, the switch S may be closed, and although switch S is herein illustrated as a manually operable push button, it will be appreciated that the closure of the same may be related in any desired manner to the clamping of the work between the electrodes 10 and 12. Closure of the switch S connects the winding of the relay R across the terminals of the control transformer T5, which action results in the closure of the contacts $a$ thereof.

Closure of the contacts $a$ of relay R completes a circuit for the primary winding of the firing transformer T1, which extends from one secondary terminal of the transformer T5 through the primary winding of transformer T1, the valve V1, and thence through the relay contacts $a$ to the other secondary terminal of transformer T5. A similar circuit is completed through the valve V2 for the primary winding of the firing transformer T2.

It may be assumed that the just-mentioned circuits are completed after transformer T4 has passed its peak in one half-cycle but before transformer T3 has reached its peak in the next half cycle; in this event, as soon as transformer T3 reaches its peak potential in said next half cycle, valve V1 is rendered conducting, enabling transformer T5 to energize transformer T1. The consequent secondary potential developed by transformer T1 fires the device 14 and initiates a flow of current through the welding transformer WT. The valve V1 remains conducting for only a small fraction of the half cycle in question, but, as aforesaid, the elimination of the firing potential from the device 14 has no effect on the flow of current therethrough during the half cycle in question.

At that stage of the next half cycle, during which the anode of valve V2 is positive with respect to the cathode thereof, at which transformer T4 develops its peak potential, valve V2 is rendered conducting, thereby enabling transformer T5 to energize transformer T2 and fire the companion device 16. Upon being fired, device 16 becomes conducting and remains so for the balance of the half cycle of the current wave.

It is believed to be evident that at the point in the next succeeding half cycle at which the peak potential of transformer T3 is reached, valve V1 is again rendered conducting, which action results in the firing of the device 14. Also, that the alternate firing of the devices 14 and 16 continues so long as the switch S is maintained closed.

To terminate the welding cycle, the switch S may be opened, in this instance, by manually releasing the same, which action de-energizes the relay R and causes the contact member $a$ thereof to open. The latter action interrupts the plate circuits of the firing valves V1 and V2 and renders these valves ineffective to energize the firing transformers T1 and T2, respectively. The just-mentioned circuit interruption does not interrupt the flow of current through whichever of the devices 14 or 16 is in a conducting condition at the time of such interruption, but does prevent further firing of these devices. Thus, if the switch S is opened, after transformer T3 has passed its peak potential in one half-cycle, but before transformer T4 has reached its peak potential in the next half cycle, the flow of welding current will be interrupted at the end of the corresponding half cycle of current flow through the device 14. On the other hand, if switch S is released, after transformer T4 has passed its peak potential, but before transformer T3 has reached its peak potential, the flow of welding current will be interrupted at the end of the corresponding half cycle of current flow through the device 16.

Similar considerations determine which of the devices 14 or 16 is the first to fire after closure of the switch S, the above described starting action being one in which device 14 is the first to fire. On the other hand, if the closure of switch S occurs after transformer T3 has reached its critical potential, but before transformer T4 reaches its critical potential, device 16 is fired first.

Although only a single specific embodiment of the invention has been described in detail, it will be appreciated that various modifications in the form, number, and arrangement of parts may be made without departing from the spirit and scope of the invention.

What is claimed is:

In a control system for controlling flow of current from an alternating current source to a work circuit, a pair of reversely connected discharge devices each having an anode, a cathode and a starting element, a pair of firing transformers one individual to each device, each said transformer having a primary winding and a secondary winding, means electrically connecting each secondary winding between the associated starting element and the cathode, first and second valves individual respectively to said firing transformers and each having principal electrodes and a control electrode, control means, electrically connecting the principal electrodes of each valve and the primary winding of the corresponding firing transformer in series circuit relation to each other and in parallel branches of a circuit which includes said control means, and phase shift means individual to each said control electrode for applying a conducting potential thereto at a predetermined time in relation to the pulsations of said source.

CLETUS J. COLLOM.